Aug. 4, 1970    W. A. FRANCIS    3,522,970

LATCH MECHANISM FOR FOLDING SEAT

Filed June 21, 1968    2 Sheets-Sheet 1

WILLIAM A. FRANCIS
INVENTOR

BY John Paul Robinson Jr.
ATTORNEY

Aug. 4, 1970     W. A. FRANCIS     3,522,970

LATCH MECHANISM FOR FOLDING SEAT

Filed June 21, 1968     2 Sheets-Sheet 2

WILLIAM A. FRANCIS
INVENTOR

BY *John Paul Robinson Jr.*

ATTORNEY

United States Patent Office 3,522,970
Patented Aug. 4, 1970

3,522,970
LATCH MECHANISM FOR FOLDING SEAT
William A. Francis, Farmington, Mich., assignor to LTV
Aerospace Corporation, Dallas, Tex., a corporation of
Delaware
Filed June 21, 1968, Ser. No. 738,981
Int. Cl. A47c *4/00*
U.S. Cl. 297—335                                    7 Claims

ABSTRACT OF THE DISCLOSURE

A vehicle seat structure comprising a movable latch assembly which is carried by a bottom seat structure that is adapted to pivot between at least two positions relative to a fixed backrest structure which has a rigid keeper assembly fixedly secured thereto. The movable latch assembly is constructed and arranged for coacting with the keeper assembly to releasably lock the bottom seat structure against pivotal movement relative to the backrest structure when the bottom seat structure is moved to at least one of a plurality of positions.

---

This invention relates to seat structures having selectively releasable locking mechanism which are utilized to releasably lock one structural member against pivotal movement relative to another structural member.

In the past, continuous and extensive efforts have been expended to develop a foldable seat structure, with varying degrees of success. A serious disadvantage of many of these prior art seat structures, is that they have complex and expensive lock mechanisms for releasably locking associated seat structures in a substantially horizontal position. Efforts have been made to design linkage arrays which would position the seat assembly in both the open and closed positions, but these linkage arrays, because of their complexity and exposed positions, were subject to frequent and extensive casual damage which caused failure or impairment of their folding and positioning capabilities. In addition, the rate of wear between complementary linkage members, which comprise such a complex linkage array, is greatly increased even under ordinary working loads, and this attributes to the numerous failures or malfunctions of these prior art linkage arrays.

A primary object of the present invention is to provide a releasable locking mechanism which is adapted to effect a positive interlocking of at least two structural members, in at least two different positions, for preventing movement of one structural member relative to the other structural member.

Another object of the present invention is to provide a vehicle seat assembly having means for releasably locking a bottom seat structure against pivotal movement relative to a backrest structure. The releasable locking means employs fewer parts and includes a rigid keeper assembly operatively associated with a movable latch assembly which could be disassembled for cleaning, repair and/or replacement of parts with extreme facility.

Other objects and advantages will be apparent from the specification and claims and from the accompanying drawing illustrative of the invention.

Figure 1:
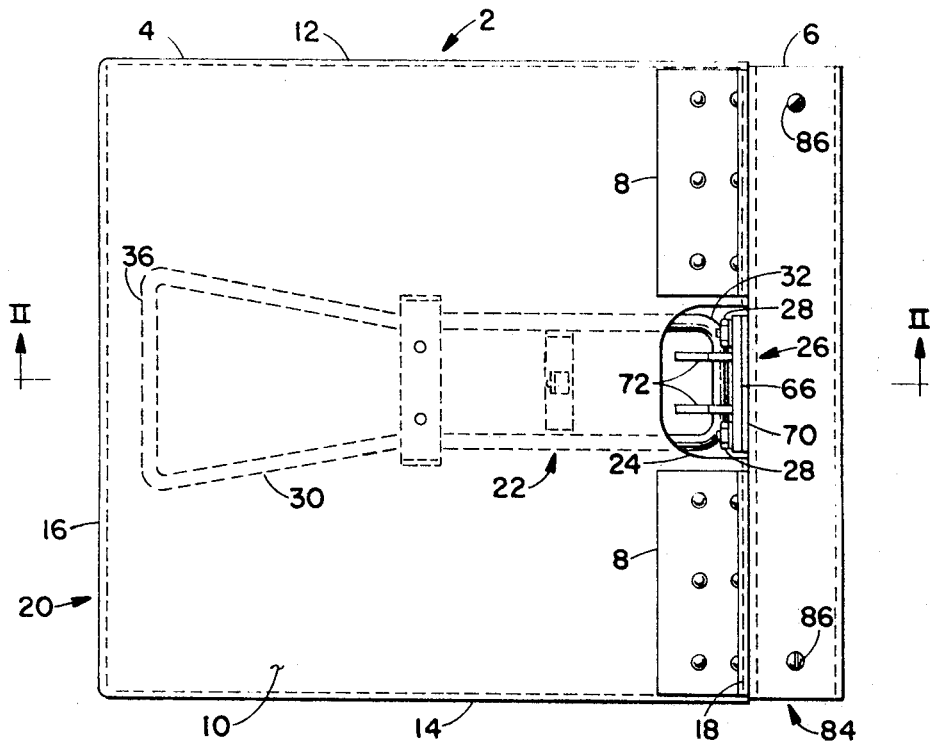
Figure 3:
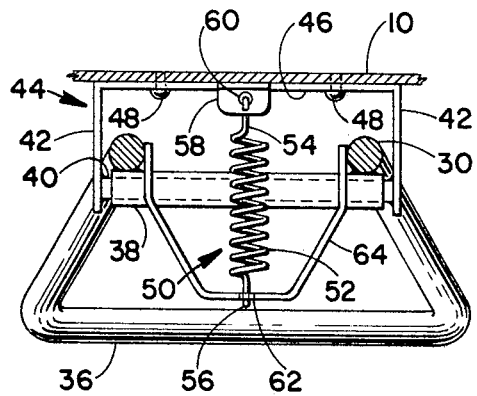
Figure 4:
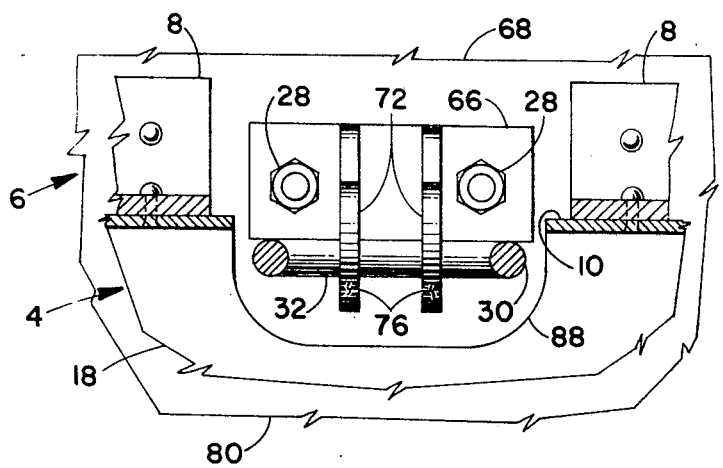

In the drawing:
FIG. 1 is a plan view of the present seat assembly,
FIG. 2 is a sectional view of the seat assembly taken along line II—II of FIG. 1,
FIG. 3 is a fragmentary, enlarged sectional view of the spring means, that biases the latch member into engagement with the keeper member, taken along line III—III of FIG. 2, and
FIG. 4 is a fragmentary, enlarged sectional view of the keeper assembly and a portion of the latch member taken along line IV—IV of FIG. 2.

Certain terminology will be used in the following description for convenience in reference only and is not intended to be limiting. The words "upwardly," "downwardly," "rightwardly" and "leftwardly" will designate directions in the drawing to which reference is made. The words "inwardly" and "outwardly" will refer to directions toward and away from the seat assembly. Such terminology will include the words specifically mentioned, derivatives thereof, and words of similar import.

For the purpose of disclosure of the seat assembly embodying the present invention, reference is now made to FIG. 1 which shows a lightweight seat assembly 2, including a bottom seat structure or arrangement 4 pivotally connected to a relatively fixed backrest structure or arrangement 6. The bottom seat structure 4, as illustrated in FIG. 1, is disposed adjacent and in advance of the backrest structure 6. The material from which both the bottom seat and backrest structures 4 and 6 are fabricated has structural and physical characteristics and/or properties similar to those of a metal, such as, steel, aluminum, magnesium, and alloys thereof; however, these structures could be formed from a desired lightweight, reinforced plastic material such as fiber glass or some other suitable material. The bottom seat structure 4 is pivotally connected to the backrest structure 6 through a plurality of spaced, axially aligned hinges 8 which pivot about a first substantially horizontal axis. The integral bottom seat structure 4 is composed of a generally planar or flat seat portion 10 for supporting the body of a passenger; however, under some circumstances and for other applications, it could be found desirable to utilize a contoured seat portion and/or other types of seat construction. The seat portion 10 generally extends the entire length and width of the bottom seat structure 4; and the outer periphery of the bottom seat structure is defined by a plurality of spaced sidewalls 12 and 14 and a plurality of spaced endwalls 16 and 18. The spaced sidewalls 12 and 14, and the spaced endwalls 16 and 18 are integral with and depend from the outer periphery of seat portion 10. Thus, the sidewalls 12 and 14 are structurally associated with endwalls 16 and 18 to effectively define with seat portion 10 an outwardly opening shroud 20 (FIG. 2) that is adapted to substantially enclose movable latch assembly 22 for preventing casual damage and/or inadvertent actuation of the latch means or assembly 22, as will be more fully described, which could unlock the bottom seat structure 4 and allow pivotal movement thereof. Moreover, as illustrated in FIG. 1, the interconnected sidewalls 12 and 14, and endwalls 16 and 18 significantly strengthen the bottom seat structure 4. The rear edge of seat portion 10 has a cut-out or recess 24 (FIG. 1) so constructed and arranged to receive a portion of a substantially rigid keeper means or assembly 26 that is connected through a plurality of suitable fasteners 28 to the backrest structure 6, the front edge of the seat portion 10 being continuous. Thus, recess 24 permits an interlocking coaction between the latch assembly 22 and keeper assembly 26 for releasably locking the bottom seat structure 4 against pivotal movement relative to the backrest structure 6.

Figure 2:
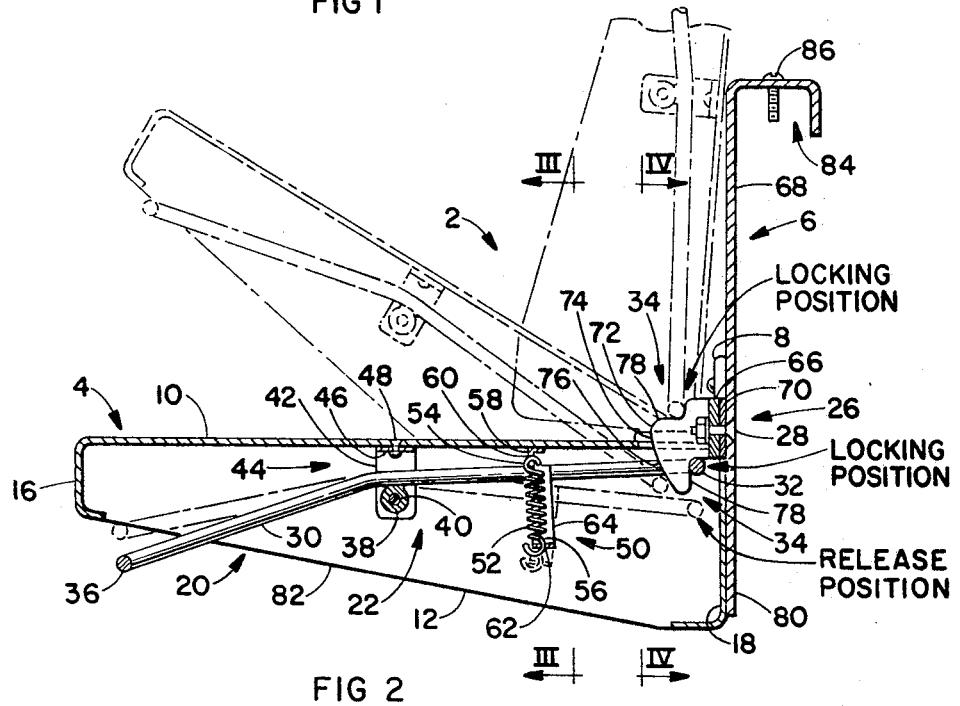

Attention is now directed to FIG. 2, which illustrates the coacting and/or interlocking relationship between the latching means or latch assembly 22 and the keeper means or assembly 26. The latch assembly 22 includes a latch member 30 preferably formed of a continuous bar or rod of circular cross-section and having one end portion 32 (a first end portion) which cooperates with at least one of a plurality of spaced peripheral recess portions 34 of keeper assembly 26 to releasably lock the bottom seat structure 4 against pivotal movement. The enlarged, force receiving, second or other end portion 36 is constructed and arranged in such a manner that a person wearing heavy gloves could effectively unlock and reposition the bottom seat structure 4, that is, the enlarged other end portion 36 is disposed generally parallel to, below, and adjacent the front endwall 16 and remote from the one end portion 32 such that it may be easily grasped and lifted with one hand. An intermediate portion of the latch member 30 is fixedly secured by conventional means, such as welding, to the outer surface of hollow sleeve 38, as illustrated in FIGS. 2 and 3, that surrounds and is rotataby supported on cylinder-like, fixed pivot member 40 for permitting relative rotation therebetween for permitting pivotal movement of latch member 30 with respect to keeper assembly 26. The two opposite end portions of pivot member 40 (FIG. 3) could be secured in numerous conventional ways, such as by welding, to a pair of spaced, substantially parallel, depending leg members 42 of U-shaped channel 44 which project downwardly from and are connected by a horizontally extending web portion 46. The web portion 46 of U-shaped channel 44 is fixedly attached by conventional fasteners 48, or other well known means, to the bottom of seat portion 10. Thus, the longitudinal axis of pivot member 40 forms a substantially horizontal second axis which is adapted to cooperate with latch member 30 for effecting pivotal movement thereof. Preferably, the second axis is spaced from and substantially parallel to the first axis about which the bottom seat structure 4 pivots. The means for continuously urging the one end portion 32, of the latch member 30, toward the keeper assembly 26 includes an extension spring 50, as shown in FIG. 2, having a close-wound, helically coiled, generally cylinder-like body portion 52, and each of the substantially axially extending opposite end portions of the helically coiled wire has a hook or loop 54 or 56 integral therewith. The relative position of the loops 54, 56 with respect to each other could be in line, at right angles, or at any other angular position as required. A flange or lug 58 depending from the bottom of seat portion 10, as illustrated in FIGS. 2 and 3, has an opening 60 which is adapted to receive loop 54, and the opposite loop 56 is received in an opening 62 in a bracket 64 which is welded or otherwise secured, in a well known manner, to latch member 30. The bracket 64 and latch member 30, however, could be a unitary structure. In the preferred embodiment, the bracket 64 depends from the latch member 30 a sufficient distance to accommodate an extension spring 50 of a desired tension or spring rate. The extension spring 50 is positioned between the one end portion 32 of latch member 30 and sleeve 38, whereby the one end portion 32 is constantly, yieldably urged toward and into engagement with the keeper assembly 26. Moreover, it is in keeping within the inventive concept to employ other types of conventional springs and/or spring arrangements to bias one end portion 32 toward keeper assembly 26.

The keeper assembly 26, as illustrated in FIGS. 2 and 4, comprises a mounting plate 66 secured by conventional fasteners 28 to the upper portion 68 of backrest structure 6. A shim or adjustment means 70 (FIG. 2) could be disposed between the upper portion 68 and mounting plate 66 to facilitate adjustment of plate 66. The plate 66, as shown in FIG. 4, has a pair of identical, spaced, substantially parallel keeper members 72 (which are referred to by the same reference numeral) mounted thereon and which extend outwardly from plate 66. The mounting plate 66 (FIG. 2) and keeper members 72 could be a unitary structure, or the keeper members 72 could be formed separately and suitably fastened to plate 66 by any known means. Each keeper member 72 has an outer, curvilinear periphery 72 which includes a holdback or guide-like surface 76 positioned between the spaced peripheral recess portions 34. The holdback surface 76 restrains the latch member 30 in a release position (shown in broken lines in FIG. 2) on initial pivotal movement of the bottom seat structure 4 from either the substantially horizontal or substantially vertical position. In addition, each peripheral recess portion 34 has an inner surface portion 78 which is constructed and arranged to complementary engage the one end portion 32, of latch member 30, to releasably lock the bottom seat structure 4 against pivotal movement. Moreover, under some circumstances and for some arrangements it could be found desirable to provide additional peripheral recess portions 34 in intermediate locations (not shown) for effecting a multiple adjustment of the bottom seat structure 4. The backrest structure 6, as shown in FIG. 2, includes the upper portion 68 that is adapted to support the upper body of an occupant and a lower portion 80 which functions as an abutment or stop surface that engages depending rear endwall 18 of bottom seat structure 4 for limiting the downward pivotal movement of the bottom seat structure 4 within its predetermined and limited range of travel. Each depending sidewall, 12 and 14, has a lower edge portion 82 which is inclined from rear endwall 18, toward front endwall 16, The height of each sidewall 12 and 14, is greater adjacent the rear end wall 18 and progressively decreases in the direction of front endwall 16. The upper edge portion of backrest structure 6, as illustrated in FIG. 2, is bent, rolled or deformed backwardly over and in a substantially parallel overlying relationship with respect to upper portion 68, for creating a downwardly opening U-shaped channel 84. The channel 84 is so constructed and arranged to complementarily engage a structural and/or wall portion of an elongate vehicle body assembly (not shown), whereby the seat assembly 2 is detachably connected to a vehicle body assembly. A conventional vehicle body assembly generally includes a floor assembly which is structurally associated with a plurality of spaced sidewall portions and a plurality of spaced endwall portions for defining a passenger-carrying zone therebetween. If desired, suitable fasteners 86 could be utilized to detachably connect the seat assembly 2 to a vehicle wall portion.

FIG. 3 is a fragmentary, enlarged sectional view of the extension spring 50 which constantly, yieldably urges one end portion 32 toward keeper members 72. The cooperative interrelationship of the parts associated with spring 50, which are illustrated in detail in FIG. 3, have been described in the preceding description; thus, no further explanation is deemed necessary.

FIG. 4 is a fragmentary, enlarged sectional view of the one end portion 32 of latch member 30 engaging the pair of spaced, substantially parallel keeper members 72 for relasably locking the bottom seat structure 4 against pivotal movement. A cutout or recess 88 is provided in the rear endwall 18 and communicates with a cutout 24 for permitting a coacting and/or interlocking engagement between one end portion 32 and keeper members 72.

During normal operation, it is sometimes advantageous to pivot the bottom seat structure 4, as illustrated in FIG. 2, upwardly (as shown in broken lines) toward and against the backrest structure 6 to provide a substantially clear and unobstructed cargo or passenger-carrying area for facilitating the loading and unloading of a vehicle. The dimensional configuration of the enlarged end portion 36 is such that by simultaneously grasping the front end wall 16 of bottom seat structure 4 and the enlarged end portion 36, a person can apply a force to enlarged end portion 36 release of latch member 30 from keeper assembly 26. After initial upward pivotal movement of bottom seat structure 4, the force which is initially applied to enlarged end portion 36 could be released and spring 50 will, thereafter, bias one end portion 32 into engagement with holdback surface 76 which restrains one end portion 32 in a release position (shown in broken lines in FIG. 2) until the bottom seat structure 4 is pivoted to the desired vertical or horizontal position and one end portion 32 registers with at least one recess portion 34. With the latch member 30 in this position, spring 50 will automatically urge one end portion 32 toward and into engagement with at least one inner surface 78, for effectively preventing pivotal movement of the bottom seat structure 4 relative to the backrest structure 6.

From the above description, it is readily apparent that many advantages reside in the unique, releasable locking device which could be employed on various seat arrangements found on aircraft, boats, and land vehicles. It is readily apparent that the enlarged, force receiving latch portion 36 would enable an occupant wearing heavy gloves, as for the prevention of frostbite or other injury, to actuate the latch assembly to effectively unlock and reposition the bottom seat structure. Further, the seat assembly is designed to attach or hang on a vehicle body assembly and the seat could be readily detached therefrom. The releasable locking assembly is simple and rugged in construction, contains few parts, and could be readily disassembled for cleaning, repair and/or replacement of parts. In addition, the present novel and improved locking assembly is reasonable in cost and efficient in carrying out the functions for which it is designed.

While only one embodiment of the invention, together with modifications thereof, have been described in detail herein and shown in the accompanying drawing, it will be evident that various further modifications are possible in the arrangement and construction of its components without departing from the scope of the invention.

What is claimed is:

1. A vehicle seat assembly comprising:
   a backrest structure
   means for mounting the backrest structure on a vehicle body assembly;
   a bottom seat structure having front and rear ends and disposed adjacent and in advance of the backrest structure, said bottom seat structure being provided with a seat portion for supporting the torso of a passenger;
   means for pivotally connecting the bottom seat structure to the backrest structure for permitting the bottom seat structure to pivot, about a first pivotal axis adjacent the rear end of the bottom seat structure, between a substantially horizontal position for allowing a vehicle passenger to ride in a seated position and a substantially vertical position to provide a substantially clear and unobstructed passenger area to facilitate loading and unloading of a vehicle; and
   means for releasably locking the bottom seat structure to the backrest structure for preventing pivotal movement of the bottom seat structure relative to the backrest structure and having a keeper means affixed to the backrest structure and provided with an outer periphery having a plurality of spaced recess portions, the locking means further comprising a latching means comprising a latching member having first and second end portions, the latching member being pivotally mounted, from a portion thereof intermediate said end portions, on and below the bottom seat structure and pivotable, upon a second axis spaced along the bottom seat structure from the first pivotal axis, between a release position and a locking position, the first end portion of the latching member being disposed adjacent the keeper means and constructed and aligned to mesh with at least one of the plurality of recess portions of the keeper means for releasably locking the bottom seat structure against pivotal movement relative to the backrest structure when the bottom seat structure is in the substantially horizontal position and the latching member is pivoted from the release position to the locking position, the latching member operatively coacting with another recess portion of the keeper means for releasably locking the bottom seat structure against pivotal movement relative to the backrest structure when the bottom seat structure is in the substantially vertical position and the latching member is pivoted from the release position to the locking position, the second end portion of the latching member being disposed adjacent a peripheral portion of the bottom seat structure for facilitating its manipulation by an operator.

2. The vehicle seat assembly recited in claim 1, further including: biasing means operatively connected to the latching member and the bottom seat structure for constantly, yieldably urging the first end portion of the latching member toward and into engagement with the keeper means.

3. The vehicle seat assembly recited in claim 1, wherein the keeper means is provided with a curved holdback surface disposed on the outer periphery thereof and extending between mutually adjacent peripheral recess portions, said holdback surface being spaced radially outwardly from the first pivotal axis beyond the recess portions for restraining the first end portion of the latching member in the release position upon forced movement of the first end portion from locking engagement with one of the peripheral recess portions and initial pivotal movement of the bottom seat structure relative to the backrest structure.

4. The vehicle seat assembly recited in claim 1, wherein the latching member comprises a continuous bar of approximately circular cross-sectional configuration, and wherein its second end portion is enlarged for facilitating grasping of the second end portion by an operator.

5. The vehicle seat assembly recited in claim 1, the bottom seat structure comprising:
   the seat portion, a plurality of spaced sidewall portions and spaced front and rear endwall portions, said seat portion being structurally associated with and above the spaced sidewall portions and the spaced front and rear endwall portions for defining therebetween an outwardly opening shroud so constructed and arranged to surround and protect the latching means; and
   means for pivotally mounting the latching means within the shroud.

6. The vehicle seat assembly recited in claim 1, wherein the second end portion of the latching member is widened and is disposed adjacent and below the front end of the bottom seat structure for facilitating grasping of said second end portion and manipulation of said latching member by an operator.

7. The vehicle seat assembly recited in claim 1, wherein the second pivotal axis is disposed parallel to the first pivoted axis and intermediate the front and rear ends of the bottom seat structure.

References Cited

UNITED STATES PATENTS

| | | | |
|---|---|---|---|
| 643,663 | 2/1900 | Lutwyche | 297—336 |
| 2,043,287 | 6/1936 | Dorton | 297—336 |
| 2,235,751 | 3/1941 | Sears | 296—65 |
| 2,627,897 | 2/1953 | Apel | 297—336 |
| 2,905,424 | 9/1959 | Snow | 248—240.4 |
| 3,059,964 | 10/1962 | Hoppe et al. | 296—65 X |

BENJAMIN HERSH, Primary Examiner

J. A. PEKAR, Assistant Examiner

U.S. Cl. X.R.

248—240.4, 291; 296—65